(12) United States Patent
Wright et al.

(10) Patent No.: US 8,147,594 B2
(45) Date of Patent: Apr. 3, 2012

(54) AIR DRYER FOR A BRAKE SYSTEM

(75) Inventors: Eric Wright, Evans Mill, NY (US);
Richard Kohar, Kingston (CA)

(73) Assignee: New York Air Brake Corporation,
Watertown, NY (US)

( * ) Notice: Subject to any disclaimer, the term of this patent is extended or adjusted under 35 U.S.C. 154(b) by 737 days.

(21) Appl. No.: 12/160,056

(22) PCT Filed: Jan. 29, 2007

(86) PCT No.: PCT/US2007/061225
§ 371 (c)(1),
(2), (4) Date: Jul. 3, 2008

(87) PCT Pub. No.: WO2007/090085
PCT Pub. Date: Aug. 9, 2007

(65) Prior Publication Data
US 2009/0007787 A1    Jan. 8, 2009

Related U.S. Application Data

(60) Provisional application No. 60/763,913, filed on Feb. 1, 2006, provisional application No. 60/829,042, filed on Oct. 11, 2006.

(51) Int. Cl.
*B01D 53/22* (2006.01)
(52) U.S. Cl. .................. 96/4; 95/43; 95/45; 95/52; 96/8; 96/10
(58) Field of Classification Search ................ 95/43, 45, 95/52; 96/4, 8, 10
See application file for complete search history.

(56) References Cited

U.S. PATENT DOCUMENTS 1,652,309 A    12/1927    Kingdon
(Continued)

FOREIGN PATENT DOCUMENTS

EP    1 275 432    1/2003
(Continued)

OTHER PUBLICATIONS

PCT/US2008/053465 Notification of Transmittal of The International Search Report and The Written Opinion of the International Searching Authority, or The Declaration Aug. 19, 2008.*

(Continued)

*Primary Examiner* — Jason M Greene
*Assistant Examiner* — Anthony Shumate

(57) ABSTRACT

An air dryer includes a housing with an air inlet, an air outlet and a liquid drain outlet; and a membrane separator having surfaces extending between a first and second ends of the membrane. A first passage in the housing is connected to the air inlet and air outlet at it respective ends and extends between the first and second ends of the membrane separator along the surfaces of the membrane separator. A second passage in the housing is connected to the drain outlet and air outlet at it respective ends and extends between the first and second ends of the membrane along a surface of the membrane separator. A valve is connected between the second passage and the drain outlet for controlling the draining of the liquid and sweep air flow through the second passage. The dryer is to be inserted in a reservoir at its inlet or outlet. A coalescing filter may be provided in the housing in series with the membrane separator and the housing would include a second drain for the coalescing filter.

6 Claims, 7 Drawing Sheets

U.S. PATENT DOCUMENTS

| | | | |
|---|---|---|---|
| 2,010,456 A | 8/1935 | Jones | |
| 2,739,713 A | 3/1956 | Robinson | |
| 2,841,420 A | 7/1958 | Woolsey et al. | |
| 3,274,750 A * | 9/1966 | Robb | 95/45 |
| 3,487,932 A | 1/1970 | Forrester et al. | |
| 3,722,187 A | 3/1973 | Potter et al. | |
| 4,909,937 A | 3/1990 | Hoffmann et al. | |
| 4,929,259 A | 5/1990 | Caskey | |
| 5,226,932 A * | 7/1993 | Prasad | 95/45 |
| 5,286,283 A | 2/1994 | Goodell | |
| 5,375,620 A | 12/1994 | Ginder, Jr. | |
| 5,383,956 A * | 1/1995 | Prasad et al. | 95/45 |
| 5,525,143 A | 6/1996 | Morgan et al. | |
| RE35,433 E | 1/1997 | Alexander, III | |
| 6,013,118 A | 1/2000 | Matsunuma et al. | |
| 6,128,825 A | 10/2000 | Cunkleman | |
| 6,136,073 A | 10/2000 | Coan | |
| 6,174,351 B1 | 1/2001 | McDowell et al. | |
| 6,719,825 B2 | 4/2004 | Wedge et al. | |
| 6,776,820 B2 | 8/2004 | Bikson | |
| 7,334,847 B2 | 2/2008 | Goodell | |
| 2003/0066427 A1 | 4/2003 | Ishida | |
| 2004/0094036 A1 | 5/2004 | Nichols et al. | |
| 2008/0087167 A1 | 4/2008 | Wright et al. | |

FOREIGN PATENT DOCUMENTS

| | | |
|---|---|---|
| JP | 09-057043 A | 3/1997 |
| JP | 09-168716 A | 6/1997 |
| JP | 11-309331 A | 11/1999 |
| WO | WO 2006 / 034840 | 4/2006 |
| WO | WO 2007 / 041559 | 4/2007 |
| WO | WO 2007/090085 A | 8/2007 |

OTHER PUBLICATIONS

PCT/US2008/053465 International Search Report Aug. 19, 2008.*
PCT/US2008/053465 Written Opinion of the International Searching Authority Aug. 19, 2008.*
PCT/US 09/53475 Written Opinion of the International Searching Authority Sep. 28, 2009.*
Notification of Transmittal of the International Search Report and the Written Opinion of the International Searching Authority, or the Declaration for PCT/US2009/053475, Aug. 11, 2009.
Written Opinion of the International Searching Authority for PCT/US2009/053475, Aug. 11, 2009.
International Search Report for International Application No. PCT/US2007/061225, dated Jan. 29, 2007.
Written Opinion of the International Searching Authority for International Patent Application No. PCT/US2007/061225, dated Jan. 29, 2007.

* cited by examiner

AIR DRYER FOR A BRAKE SYSTEM

This Application claims priority to PCT/US07/61225, 60/763,913, filed Feb. 1, 2006, and 60/829,042, filed Oct. 11, 2006.

BACKGROUND OF THE INVENTION

The present invention relates generally to air dryers, and more specifically, to an air dryer for a brake system for vehicles.

Air dryers employing membranes consisting of a permeable membrane capable of blocking the passage of nitrogen and oxygen molecules, but allowing water vapor molecules to pass through, as described in U.S. Pat. Nos. 6,719,825 and 5,525,143 amongst many others. In one variation of the technology, the air to be dried passes through the center of the membrane element. The membrane permits the passage of the water vapor to the outside of the membrane, but prevents the passage of the air to the outside of the membrane, thereby drying the air. To work effectively, the outside of the membrane must be kept dry and at a lower pressure than the inside, creating the partial pressure differential to drive the water vapor out. This is done by providing some fraction of the dry output air as a counter flow sweep air across the outside of the membrane. The sweep air can be provided by sweep air orifice(s) connecting the dry air in the membrane air dryer outlet to the sweep air chamber surrounding the outside of the membrane. The orifices control the volume of sweep air, typically 10-20% of the dryer capacity and create a pressure drop in the sweep air volume. The sweep air and entrapped moisture are expelled to atmosphere. U.S. Pat. No. 5,375,620 shows a self-adjusting flow metering device for the sweep air.

BRIEF SUMMARY OF THE INVENTION

The present disclosure is directed to an air dryer, for example, for locomotives, packaged to fit inside a reservoir. The air dryer is generally cylindrical with a circular mounting flange on one end, which bolts to a similar mounting flange welded to the end of the reservoir. This arrangement solves the problem of finding room for the air dryer between main reservoir #1 and #2 on a locomotive, protects the air dryer and especially the vulnerable membrane element from the very high ambient temperatures (as high as 300 degrees F.) during operation of the locomotive in tunnels; protects the air dryer from environmental hazards, like flying stone ballast; eliminates installation piping, and minimizes weight.

Such a membrane air dryer includes a housing with an air inlet, an air outlet, a liquid drain outlet; and a membrane separator having surfaces extending between a first and second ends of the membrane. A first passage in the housing is connected to the air inlet and air outlet at its respective ends and extends between the first and second ends of the membrane along surfaces of the membrane. A second passage in the housing is connected to the drain outlet and air outlet at its respective ends and extends between the first and second ends of the membrane along surfaces of the membrane. A valve is connected between the second passage and the drain outlet for controlling the draining of the liquid and sweep air flow through the second passage.

Another air dryer includes a housing with an air inlet, an air outlet and first and second liquid drain outlets. A membrane dryer is mounted to the housing and includes a first passage connected to the air inlet and the air outlet at its respective ends and a second passage connected to the first drain outlet and the air outlet at its respective ends. A coalescing filter, with or without a particulate filter, maybe connected in a series in the housing, connects the air inlet to the first passage of the membrane dryer, and the coalescing filter is connected to the second drain outlet.

The valves may be an electro-pneumatic valve. A cover is removable mounted to the housing adjacent the membrane to allow removal of the membrane and the filters from the housing. The air inlet and the drain outlet are offset from the axis of the membrane and the cap. The housing may be mounted in the inlet of a reservoir and extends from the reservoir inlet into the interior of the reservoir so that the housing inlet is the inlet of the reservoir, the housing outlet is interior the reservoir and the drain outlet of the housing is exterior the reservoir.

In a vehicle brake system including a brake controller and the reservoir with the air dryer, the brake controller controls the valve. The controller opens the valve when the brake system uses air from the reservoir and closes the valve after the brake system terminates using air from the reservoir. The controller delays closing the valve after the brake system terminates using air from the reservoir until the reservoir is recharged, and further delays closing for a predetermined time after the reservoir is recharged to fully purge the sweep volume in the membrane air dryer of all moisture.

In a combination of a reservoir having an air port and an air/liquid separator having a housing with a separator member between an inlet and an outlet, the housing extends from the reservoir port into the interior of the reservoir so that one of the housing's inlet and outlet is the port of the reservoir, the other of the housing's inlet and outlet is interior the reservoir and the drain outlet of the housing is exterior the reservoir. The housing may have a drain interior or exterior the reservoir. A cover removable mounted to the housing adjacent the membrane to allow removal of the membrane from the housing; and the one of the housing's inlet and outlet and the drain outlet are offset from the axis of the membrane and the cap. The separator member is one of or both a membrane separator and a coalescing filter.

A reservoir includes an air port and a housing at the air port having a bore into the interior of the reservoir, an air inlet/outlet and a drain outlet. The bore is adapted to removable receive a filter element. The inlet/outlet is exterior the reservoir and connected to the bore. The drain outlet connects the bore to the exterior of the reservoir adjacent the air port to drain water from the filter element.

These and other aspects of the present method will become apparent from the following detailed description of the method, when considered in conjunction with accompanying drawings.

DETAILED DESCRIPTION OF THE PREFERRED EMBODIMENTS

Figure 1:
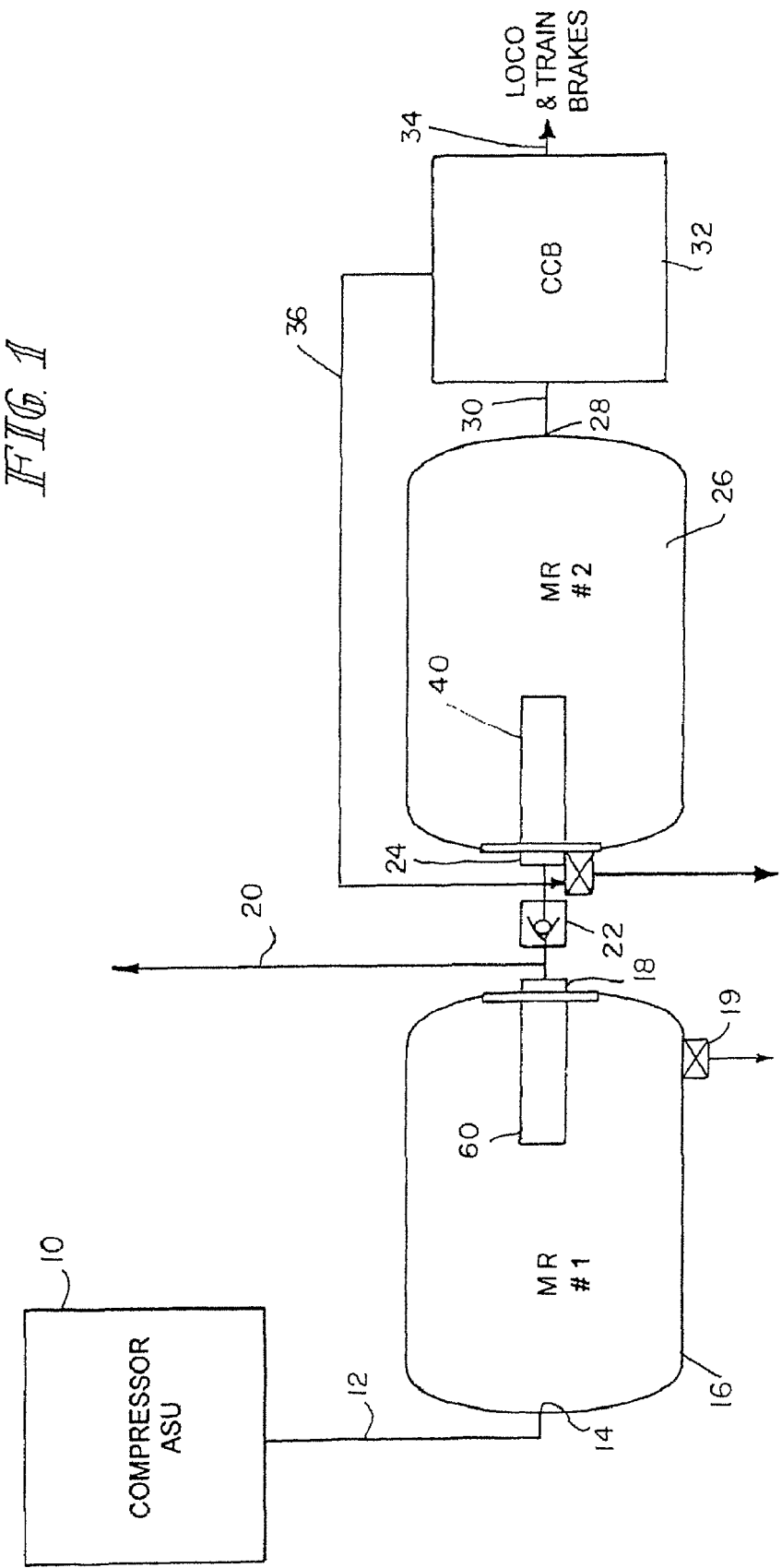
FIG. 1 is a schematic of a locomotive air supply and brake controller according to the present disclosure.

A locomotive brake supply and brake controller is shown in FIG. 1. A compressor 10 driven by the engines of the locomotive provides a source of compressed air through line 12 to inlet 14 of the first main reservoir MR. 16. The outlet 18 of the reservoir 16 is connected to other non-brake air consuming devices at line 20. The outlet 18 is also connected to the inlet 24 of the second main reservoir 26 via one-way check valve 22. The outlet 28 of the second main reservoir MR 26 is connected to a brake controller illustrated as a CCB computer controlled brake system 32. The outlet 34 of the computer controlled brake system 32 provides an appropriate pneumatic control signals for the locomotive and train brakes. As will be discussed below, the computer controlled brake system 32 provides, via line 36, control of the drain 54 of membrane air filter 40 within the main reservoir 26. As also will be discussed, control may also be provided to the drain valve 19 of the first main reservoir MR 16 either from the computer brake control system 32 or other control systems on the locomotive. The main reservoir 16 includes a coalescing pre-filter 60 therein. Coalescing pre-filter 60, although shown schematically in the outlet 18 of MR 16, can alternately be provided in the inlet 14 of MR 16.

Figure 2:
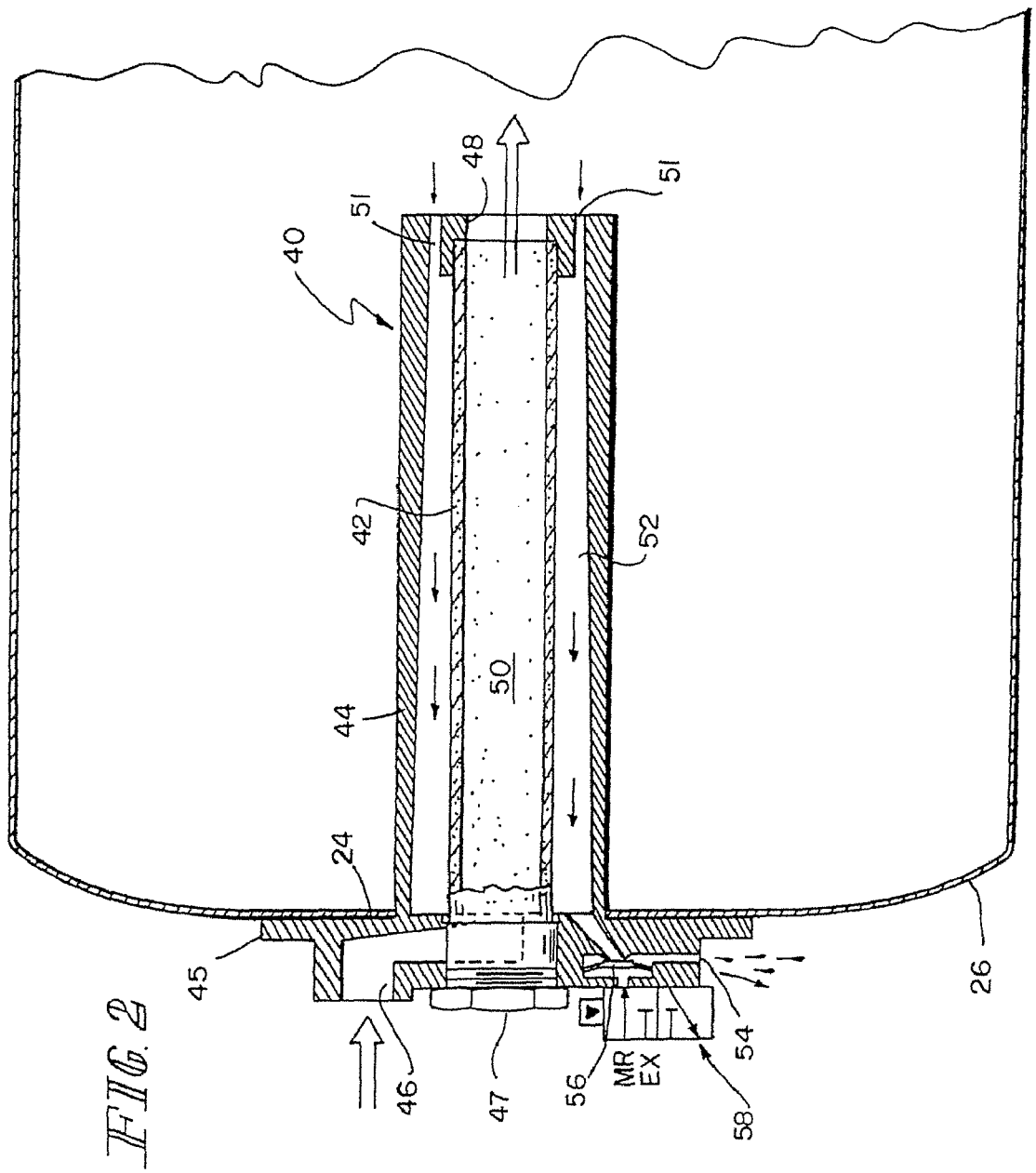
FIG. 2 is an embodiment of a membrane air dryer according to the present disclosure.

A membrane air dryer 40 is shown in FIG. 2 as including a housing 44 with an air inlet 46, an air outlet 48 and a liquid drain outlet 54. A membrane separator 42 is shown schematically with an inner surface and an outer surface extending between a first and second ends of the membrane 42. Typical construction of a membrane module is a bundle of small diameter hollow fibers (membrane), each with an inner surface and an outer surface extending between a first and second ends of the membrane. A first passage 50, made up of the inner diameters of each of the hollow fiber membranes in the housing 44 is connected to the air inlet 46 and air outlet 48 at it respective ends and extends between the first and second ends of the membrane 42 along one of the interior and the exterior of the membrane. A second passage 52 comprising the outer diameters of each of the hollow fiber membranes in the housing 44 is connected to the drain outlet 54 and the sweep air inlet 51 adjacent the housing air outlet 48 at it respective ends. The second passage extends between the first and second ends of the membrane 42 along the other of the interior and the exterior of the membrane. A valve 56, 58 is connected between the second passage 52 and the drain outlet 54 for controlling the draining of the liquid and sweep air flow through the second passage 52.

The valve may be an electro-pneumatic valve or a solenoid controlled diaphragm-type (or conventional-type) drain valve 56, 58. A cover plate 47 is removable mounted to the housing 44 adjacent the membrane 42 to allow removal of the membrane 42 from the housing 44. The air inlet 46 and the drain outlet 54 are offset from the axis of the membrane 42 and the cover plate 47. This allows servicing the membrane element 42 by removal of a cover or cover plate 47, without disturbing piping or removal of the complete unit from the reservoir 26.

The housing 44 may be mounted in the inlet 24 of a reservoir by a collar 45 which may be welded to the reservoir 26 or bolted to a flange on the inlet 24. The housing extends from the reservoir inlet 24 into the interior of the reservoir 26 so that the housing's inlet 46 is the inlet 24 of the reservoir 26. The housing's outlet 48 is interior the reservoir 26 and the drain outlet 54 of the housing 44 is exterior the reservoir 26.

Most membrane dryers for industrial use have a constant sweep flow. This is undesirable on a locomotive as it wastes air and may deplete the air in the reservoir if the locomotive is idled with power shut off. Further, unlike many industrial uses, the air is consumed from the reservoirs 16 and 26 only intermittently by the pneumatic brake system. Main Reservoir 26 is generally protected by the check valve 22 and is used exclusively by the brakes. The membrane air dyer 40 for a locomotive solves this problem of wasted air due to a constant sweep flow by adding a solenoid controlled diaphragm-type (or conventional-type) drain valve 56,58 to the output of the sweep air chamber 52 shown in FIG. 2. Although the sweep air or drain valve 56, 58 is shown schematically at the exhaust of the sweep air chamber, it could also be arranged to control the flow of sweep air into the inlet of the sweep air chamber while still venting the sweep air to the outside of the MR 2 as shown in FIG. 2.

When closed, the valve 56 closes the communication of the sweep volume through passage 52 to atmosphere, thereby preventing the venting of the sweep air. The drain valve 56 is controlled by a solenoid valve 58 which is controlled by the CCB computer controlled brake system 32 on the locomotive. The CCB 32, because it is a computer controlled brake system with transducers and other controls necessary for brake operation, can determine when the brakes are consuming air from the MR 26. In operation, the CCB 32 will open the dryer drain valve 56 whenever the brake system is consuming air from MR 26, which allows the resumption of flow of sweep air around the outside of the membrane element 42 in passage 52 at the same time that moisture laden air is flowing into the inlet 46 of the air dryer 40 to replenish the air used by the brakes. Thus, the air dryer 40 only consumes sweep air when sweep air is needed to dry air flowing through the air dryer.

Further, the CCB can maintain sweep flow for a period of time after the brake system is no longer consuming air from MR 27 before closing the drain valve 56 to assure that the MR 26 is fully replenished with dry air, further it can maintain sweep flow for an additional predetermined time to assure that the sweep air volume is free of moisture. The lag time, during which the sweep flow is maintained after air consumption by the brakes, can be calculated based on the air flow measured by the CCB 32 and the duration of the flow, knowledge of compressor 10 on-off pressure switch points, and knowledge of the compressor output capacity. The lag time can alternatively or concurrently be determined by monitoring the pressure increase in MR 26 as it is replenished by the air supply system. When the rate of pressure increase in MR 26 decreases to some pre-determined level and/or the pressure in MR 26 reaches the compressor control upper limit pressure, the sweep air is terminated. Optionally the lag time calculation could be optimized by CCB 32 reading a digital signal from the compressor control indicating whether the compressor is pumping or not.

Sweep flow would be enabled whenever 1) the brake system consumes air, 2) the compressor 10 is turned on and the pressure in MR 26 is less than the compressor pressure upper limit control, typically 145 psi, and 3) for some lag time after cessation of air consumption by the brakes, until the MR 26 is substantively recharged and the sweep air volume is substantively purged of moist air.

The membrane air dryer assembly 40 may also includes a test fitting or pipe plug which allows the insertion of a test fitting to measure the amount of sweep air, where increased amount of sweep air is an indicator of failure or rupture of the membrane element. To perform the test, the drain valve 56 is closed, and the test fitting inserted into the threaded fitting in the body of the membrane dryer assembly. The test fitting includes a fixed test orifice of predetermined size connecting the sweep air volume to atmosphere, sized to result in a predetermined pressure drop across the orifice for expected sweep flow. The membrane air dryer body 44 or the test fitting also includes a connection for a pressure gage or other suitable pressure measuring device to measure the pressure in the sweep volume when the drain valve 56 is closed and the test orifice is installed. Membrane leakage is thus characterized by an increase in the pressure in the sweep volume. The membrane requires replacement when the test pressure exceeds some predetermined value.

Figure 3:
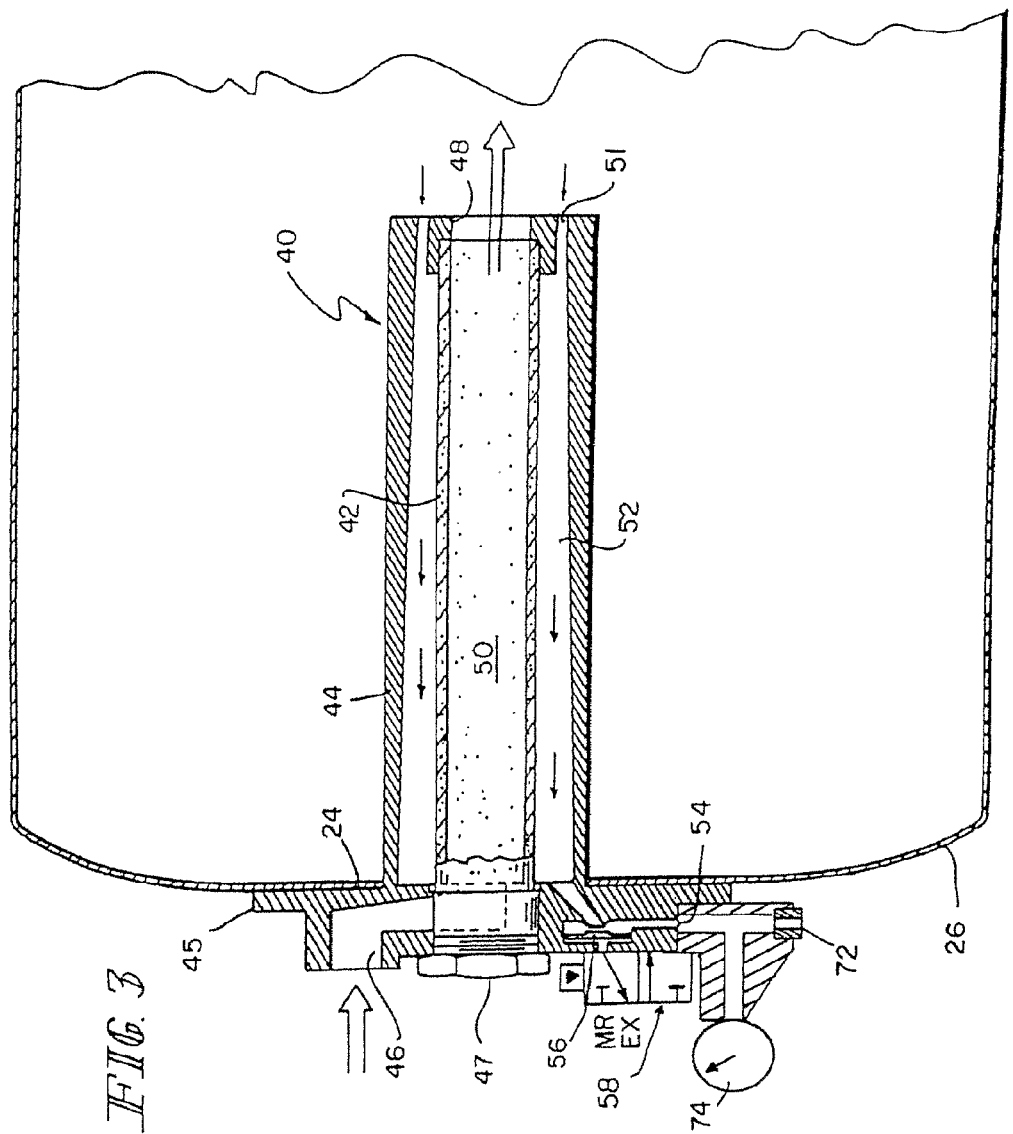
FIG. 3 is an embodiment of the membrane air dryer with a test device according to the present disclosure.

Alternatively as shown in FIG. 3, the test orifice and pressure measurement device could be inserted in the drain port of the drain valve, and the test performed with the drain valve 56 is open. The test fitting 70 is mounted in the drain port 54 and includes the restricted test orifice 72 and a pressure gauge 74.

Figure 5:
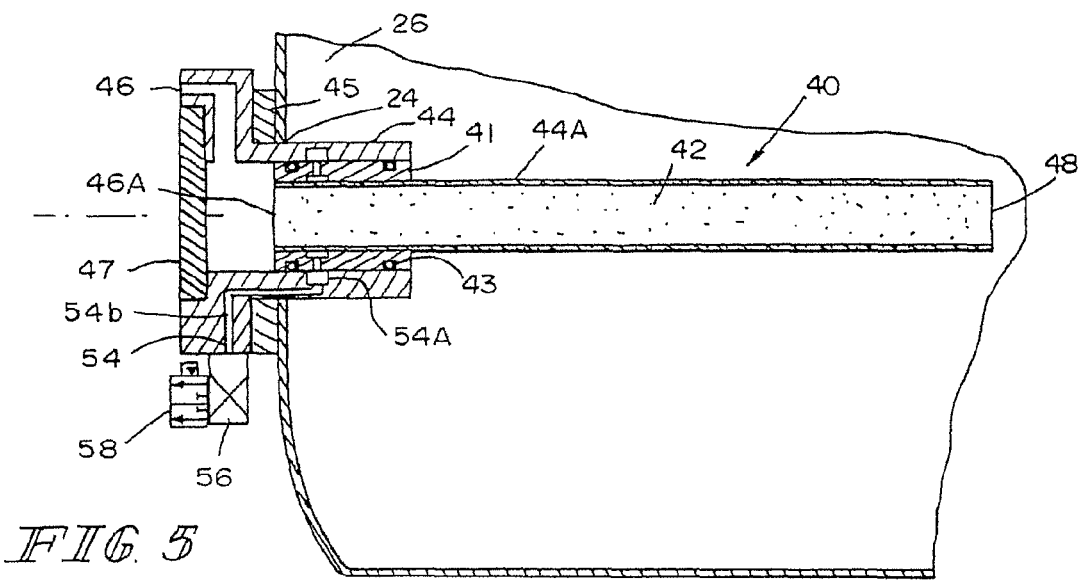
FIG. 5 is an embodiment of a membrane air dryer with a removable membrane air dryer module according to the present disclosure.

FIGS. 2 and 3 show the housing 44 as defining the appropriate passage for the filter element 42 to be removed from the housing 44. A variation is illustrated in FIG. 5 and shows the membrane filter element 42 and its housing 44A removable as a module from the housing 44. The housing 44 is joined to flange 45 of the MR 26 and includes air inlet 46. The membrane housing 44A includes the membrane member 42 and has an air inlet 46A and the outlet 48. A collar 41 of the housing 44A is received in the housing 44. It is sealed thereto by sealing means 43, shown as o-rings. The pair of o-rings 43 on each side of the drain port 54 which is aligned with passage 54B with housing 44 and connects it to the drain the drain outlet 54. Valve 56, 58 are provided at the drain outlet 54. For maintenance, the cover plate 47 is removed and the membrane filter 40 including housing 44A, collar 41 and membrane 42 are removed. A new membrane air dryer or filter 40 may then be installed.

Figure 4:
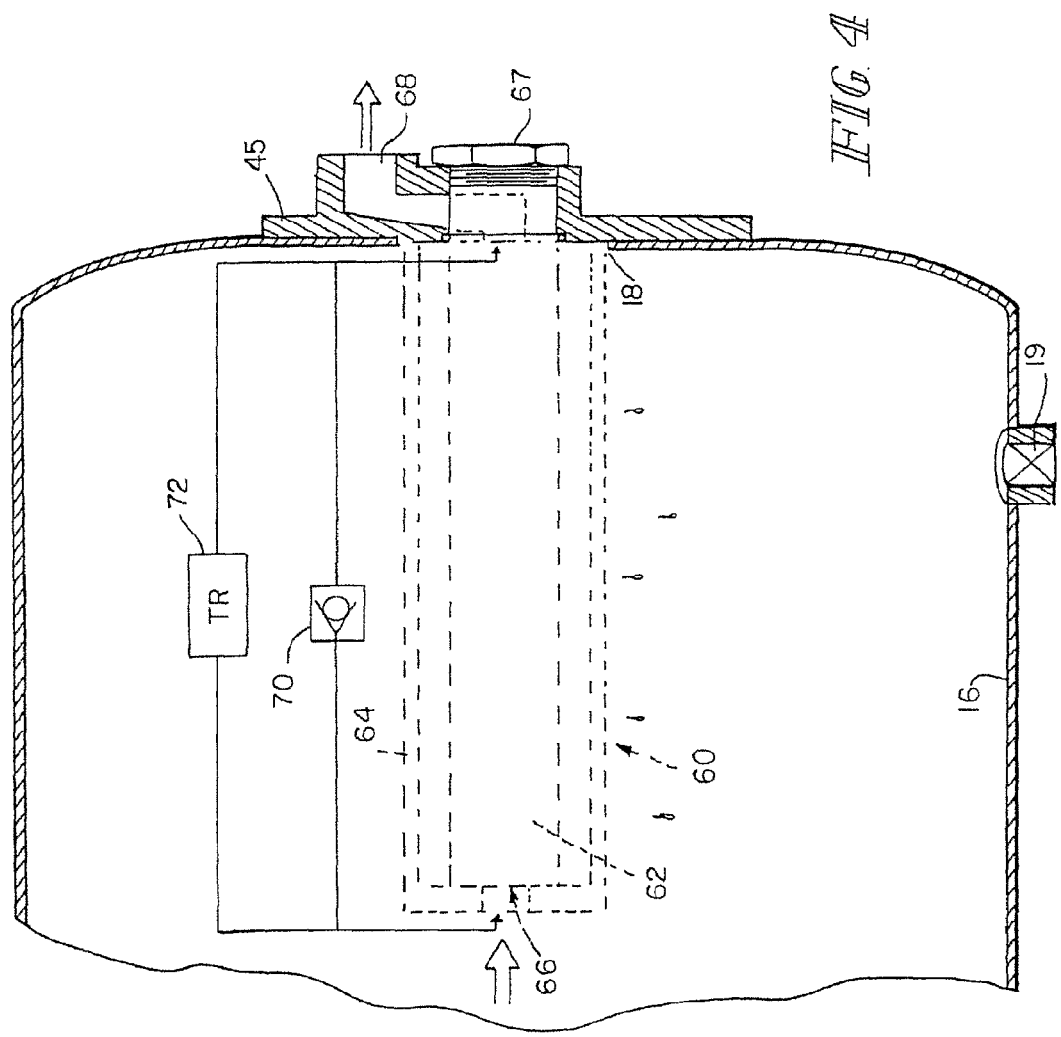
FIG. 4 is an embodiment of coalescing filter according to the present disclosure.

The air dryer system for a locomotive may optionally include a coalescing pre-filter 60 to remove liquid water and oil vapor from the air stream prior to passing through the membrane 42, as well as the back-flow check valve 22 typically installed between MR 16 and 26. The coalescing pre-filter 60 can likewise be packaged in a cylindrical form with a circular mounting flange for mounting in the inlet 14 or discharge 18 end of MR 16, which feeds MR 26. As illustrated in FIG. 4, the coalescing filter 60 includes a filter element 62 in a housing 64 having an inlet 66 and an outlet 68.

The coalescing pre-filter 60 is thus mounted inside main reservoir 16, where it is protected from the environment, where installation space is available, and with significant weight, cost, and complexity reduction. The coalescing pre-filter 60 mounted inside the MR 16, can be designed to discharge the condensed oil, water and other liquids directly into MR 16, where they are expelled by the pre-existing automatic drain valves 19 on the bottom of the MR 16. Thus the pre-filter installed inside the MR 16 does not require a pressure proof housing around the filter 60, does not require a volume to capture the coalesced liquids, does not require separate drain valves or drain valve heaters, and does not require separate controls to periodically purge the accumulated liquid. All of those functions are provided by the reservoir itself and/or the pre-existing and necessary automatic drain valves 19 on the reservoirs. Thus it can be seen that this mounting arrangement of the pre-filter installed inside the MR 16 offers significant advantage.

The pre-filter 60 can be provided with a by-pass check valve 70 to allow air flow in the event of plugging of the filter 60 by ice or lack of maintenance. Pressure monitoring means 72 can be provided, either a mechanical indicator or an electrical pressure switch or transducer, to measure the pressure drop across the filter element 62 for indication of required maintenance. Preferentially that pressure is measured by a transducer 72 which is monitored by the on-board locomotive diagnostic system or by CCB 32, which in turn can update the maintenance screens on the locomotive.

the coalescing pre-filter assembly 60 is designed in such a way that the filter element 62 can be serviced without disrupting the piping or requiring the removal of the complete assembly from the reservoir where it is installed. A cap 67 is removable to provide access to the filter element 62.

Alternatively, the coalescing pre-filter 60 may be installed in the manner described above, but in the inlet 14 of MR 16, instead of (or in addition to) the outlet 18 of MR 16. The backflow check valve 22 may be deleted or could be included as part of the membrane air dryer assembly. Coalescing filters generally work optimally when the air flow is directed from inside to outside the filter element and the coalesced liquid is allowed to drain from the outside of the element. Positioning the coalescing pre-filter in the inlet 14 to the MR 16 has the advantage of inside to outside air flow while eliminating a need for circuitous air routing in the filter housing, and eliminating the need for a pressure tight filter housing. In this arrangement, the coalesced liquid can drip to the bottom of the MR 16 where it is discharged by pre-existing automatic drain valves 19.

As a further alternative, the coalescing pre-filter 60 may be installed exterior and between both reservoirs 16 and 26. A drain valve would be provided and controlled by the computer control brake system 32 or other locomotive computer. The coalescing pre-filter 60 may be an integral unit with the membrane filter 40 or mounted to the inlet of the membrane filter 40 exterior the reservoir 26.

Figure 6:
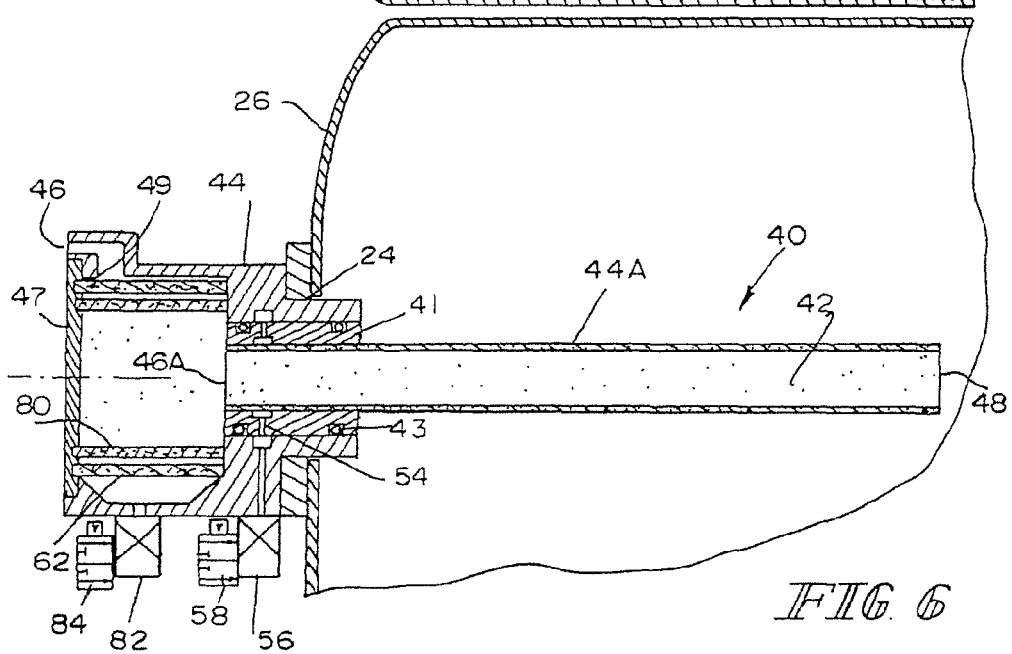
FIG. 6 is an embodiment of an air dryer with a removable membrane air dryer module, coalescing filter and particulate filter with two liquid drains according to the present disclosure.
Figure 7:
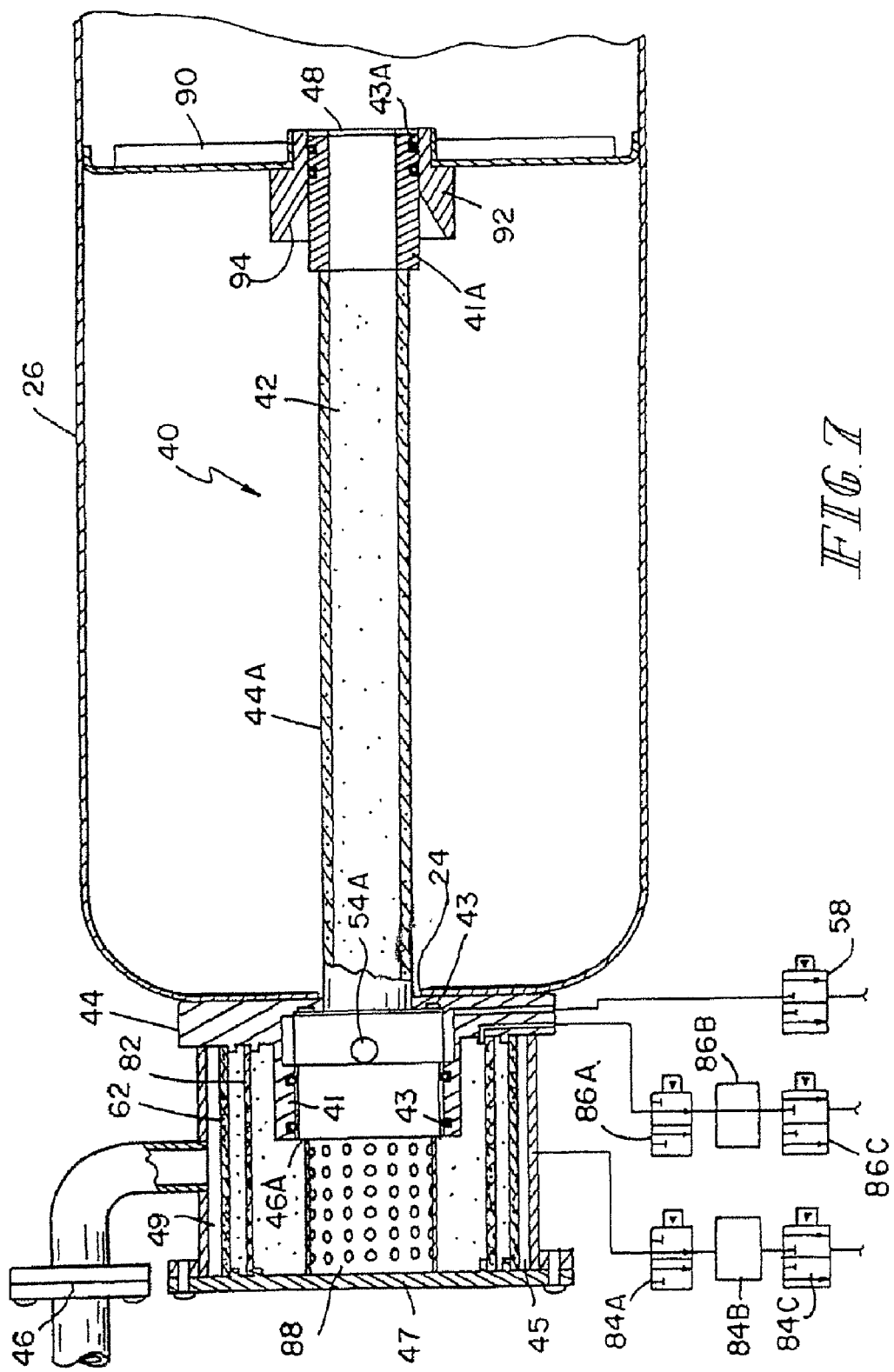
FIG. 7 is an embodiment of an air dryer with a removable membrane air dryer module, coalescing filter and particulate filter with three liquid drains according to the present disclosure.
Figure 8:
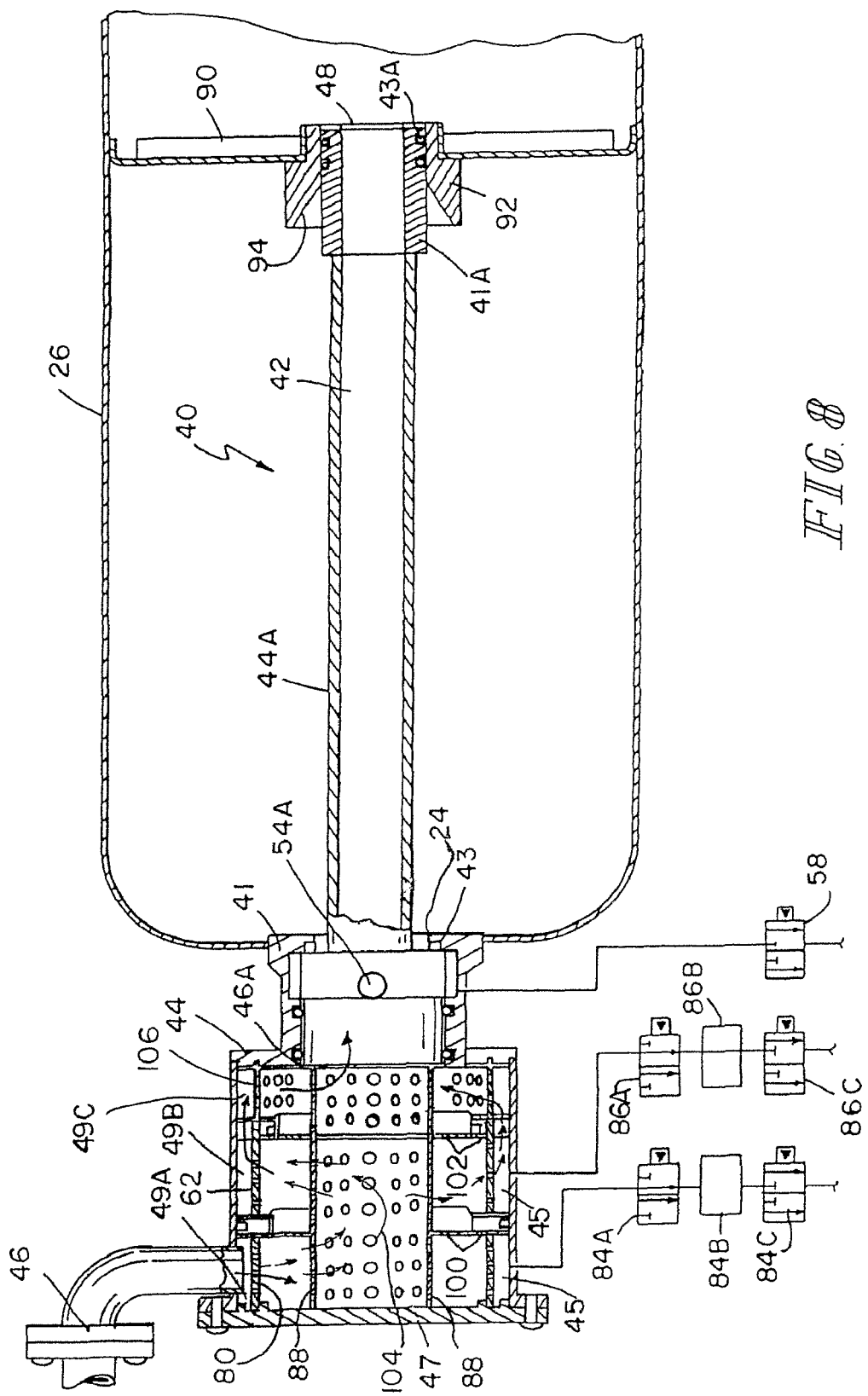
FIG. 8 is an embodiment of a membrane air dryer with integral particulate and coalescing filters arranged for inside-out flow of air through the coalescer.

Filter 60 may also be provided in the MR 26 in combination with the membrane air dryer 40 as illustrated in FIGS. 6, 7 and 8. The housing 44 is enlarged to include a chamber 49 for receiving the coalescing element 62 by itself or in combination with a particulate filter 80. They are mounted between the housing 44 and the cover plate 47. Appropriate recesses or ledges are provided on the housing 44 and the cover plate 47 to align and secure the filters 62 and 80 in the housing 44. As shown in FIG. 6, housing 44 is modified to provide a sump 45 to which a drain valves 82, 84 are connected. These valves are identical to that of 56, 58 and may also be controlled by the CCB such that they are opened at the appropriate time in the operation of the locomotive and/or flow of the air from the air supply.

In FIGS. 6 and 7, the filter 62 and 80 are concentric with each other and coaxial to the membrane air dryer 40. The air through inlet 46 passes through the filter 62 and 80 prior to being received in the air inlet 46A of the membrane dryer 40. As is well-known, the coalescing filter element 62 precipitates air-born water and oil vapor from the air stream. The particulate filter 80 filters out very fine air-born dust and solid material such as carbon particles from diesel combustion or other contaminants or other particulates which contaminate the membrane dryer module 40.

The present design differentiates from the prior art in that the coalescing filter 62, the particulate filter 80 and the air dryer 40 of the prior art are all connected in series external to the tank 26. The present design is an improvement over the prior art in that merely removing the cover plate 47 allows replacement and maintenance of the filter 62 and 80 and the dryer 40. No major disassembly is required. While the coalescing filter element 62 and the particulate filter 80 require annual maintenance, the membrane dryer 40 would be replaced every six to eight years depending on actual service conditions.

A variation of the combined module of FIG. 6 is illustrated in FIG. 7. Instead of a common drain valve in 82,84 for the coalescing filter element 62 and the particular filter 80, each filter has its own set of valves. The bottom of chamber 49 adjacent the coalescing filter includes a two-series valve 84A and 84C separated by sump 84B. A separate port as provided at the inner surface of the particular filter 80. A series set of valves 86A and 86C are separated by a sump 86B. The valves 84A and C and 86A and C are controlled by the CCB as described for the valves 58 and 84 of FIG. 6. The valves 84A, 86A are operated to remove the water, oil, etc., from the housing chamber 49 and empty into respective sumps 84B, 86B. The valves 84C, 86C, which empty the sumps 84B, 86B, may be operated at a different time than valve 84A, 86A.

As a further modification, perforated tube 84 is provided between the cover plate 47 and the inlet 46A of the membrane dryer 40. This secures the membrane dryer within the housing 44.

FIG. 8 shows yet further modification whereby the particulate filter 80 and coalescing filter elements 62 are arranged axially, which provides for simplified inside-outside air flow through the coalescer. The chamber 49 of the housing 44 is divided into three chambers 49A, 49B and 49C by walls 100 and 102. The air as shown by arrow 104 flows from inlet 46 and passes through particulate filter 80 and a portion of perforated tube 88 in chamber 49A to chamber 49B. The air then flows through portion of the perforated tube 88 and the coalescing filter element 62 in chamber 49B. Next, the air flows into chamber 49C and through perforated pipe 106 in chamber 49C to the inlet 49A of the membrane dryer 40.

Although the FIG. 8 shows separate drain valves for the particulate filter chamber 49A and coalescing chamber 49B, a single drain valve could be used to drain both chambers as described for FIG. 6.

The interior of the reservoir 26 may include a support bracket 90 welded or otherwise suitably attached thereto. A seat 92 receives endcap 41A of the membrane dryer 40. O-rings may be provided on endcap 41A to secure the endcap 41A in the seat 92 and to minimize harmful vibration between the two. A cam surface 94 is provided to guide and align the endcap 41A into the seat 92. The bracket 90 may be provided in all the shown embodiments.

Although not shown, the area of the air inlet 46 into the chamber 49 is shaped or includes a baffle to distribute the air around the filters 62 and 80.

Although the present method has been described and illustrated in detail, it is to be clearly understood that this is done by way of illustration and example only and is not to be taken by way of limitation. Although the dryer has been shown in a train air supply system, it can also be used in a truck brake system. The particular filter structure may be used even if it is not mounted interior the reservoir. The scope of the present method is to be limited only by the terms of the appended claims.

What is claimed:

1. A membrane air dryer for insertion into a reservoir or an inlet or outlet of the reservoir, the dryer comprising:
    a housing with an air inlet adjacent to a first end of the housing, an air outlet adjacent to a second end of the housing and a sweep air and liquid drain outlet adjacent the first end of the housing;
    a membrane separator having surfaces extending between first and second ends of the membrane;
    a first passage in the housing connected to the air inlet and air outlet at it respective ends and extending between the first and second ends of the membrane separator along the surfaces of the membrane separator;
    a second passage in the housing connected to the sweep air and liquid drain outlet and a sweep air inlet at respective ends and extending between the first and second ends of the membrane along a surface of the membrane separator;
    a valve connected to the sweep air and liquid drain outlet for controlling the draining of the liquid and sweep air flow and also controlling flow of the sweep air through the second passage, the valve being connected to the sweep air and liquid drain outlet at the first end of the housing, and
    a cover removably mounted to the housing at the first end and adjacent to the membrane separator to allow removal of the membrane separator from the housing at the first end, wherein the air inlet, the sweep air and liquid drain outlet and the valve are offset from a longitudinal axis of the membrane separator and the cover for servicing the membrane separator by removal of the cover without complete removal of the membrane air dryer from the reservoir.

2. The membrane air dryer according to claim 1, including the cover removably mounted to the housing adjacent the membrane separator to allow removal of the membrane separator from the housing; and wherein the air inlet and the drain outlet are offset from the axis of the membrane separator and a cap.

3. A reservoir having an inlet and a membrane air dryer of claim 1 extending from a reservoir inlet into the interior of the reservoir so that the housing's air inlet is connected to the inlet of the reservoir, the housing's air outlet is interior the reservoir and the drain outlet of the housing is exterior the reservoir.

4. A vehicle brake system including a brake controller and the reservoir of claim 3, and wherein the brake controller controls the valve.

5. The system according to claim 4, wherein the controller opens the valve when the brake system uses air from the reservoir and closes the valve after the brake system terminates using air from the reservoir.

6. The system according to claim 5, wherein the controller delays closing the valve after the brake system terminates using air from the reservoir until the reservoir is recharged.

* * * * *